US006970886B1

(12) United States Patent (10) Patent No.: US 6,970,886 B1
Conwell et al. (45) Date of Patent: Nov. 29, 2005

(54) CONSUMER DRIVEN METHODS FOR ASSOCIATING CONTENT INDENTIFIERS WITH RELATED WEB ADDRESSES

(75) Inventors: William Y. Conwell, Portland, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 642 days.

(21) Appl. No.: 09/578,551

(22) Filed: May 25, 2000

(51) Int. Cl.[7] .............................................. G06F 17/30
(52) U.S. Cl. ..................................... 707/104.1; 707/3
(58) Field of Search .............................. 707/1–10, 100, 707/104.1, 200, 205; 709/223–225, 219, 709/217; 705/10, 14

(56) References Cited

U.S. PATENT DOCUMENTS

| | | | |
|---|---|---|---|
| 6,122,403 A | 9/2000 | Rhoads | |
| 6,269,361 B1 * | 7/2001 | Davis et al. | 707/2 |
| 6,286,036 B1 | 9/2001 | Rhoads | |
| 6,311,214 B1 | 10/2001 | Rhoads | |
| 6,324,573 B1 | 11/2001 | Rhoads | |
| 6,389,467 B1 * | 5/2002 | Eyal | 709/223 |
| 6,401,118 B1 * | 6/2002 | Thomas | 707/4 |
| 2001/0001854 A1 | 5/2001 | Schena et al. | |
| 2001/0020242 A1 | 9/2001 | Gupta et al. | |
| 2001/0055391 A1 | 12/2001 | Jacobs | |
| 2001/0056573 A1 | 12/2001 | Kavac et al. | |
| 2002/0071556 A1 | 6/2002 | Moskowitz et al. | |

FOREIGN PATENT DOCUMENTS

WO   WO01/06703   1/2001

OTHER PUBLICATIONS

Ponce, B., "The impact of MP3 and the future of digital entertainment products", WWW Artists consortium, NY, USA, Sep. 1999, pp. 68-70.*
"NSI Commandeers Deadbeat Domains," Wired News, Jun. 26, 2000 3 pp.
"Network Solutions Creates Online Marketplace for Customers' Domain Names," Network Solutions, May 10, 2000, 2 pp.

(Continued)

Primary Examiner—Mohammad Ali
(74) Attorney, Agent, or Firm—Digimarc Corporation

(57) ABSTRACT

Media content objects, such as audio MP3 files, are associated with identifiers. The identifiers can be assigned, or can be implicit (e.g., derived from other data in the content object, as by hashing). A user of the file can utilize the identifier to query a database and thereby obtain the URL of one or more internet resources associated with that content (e.g., web sites with fan info, concert schedules, opportunities to purchase CDs, etc.). Some identifiers may not be associated with URLs in the database. A user who queries the database with such an identifier (e.g., which may be derived from an independently produced MP3) finds that there is not yet an associated URL. In this case, the user may be given the opportunity to lease this virtual address for a predetermined period, with the privilege of specifying a URL for that identifier. Subsequent users who link from this particular MP3 file thereafter are directed to the URL specified by the first user. In some arrangements, the leasing privilege is awarded through a brief auction, triggered by the first user's discovery that the address is not used. Other users who query the database with that identifier during the period of the auction are permitted to bid. When the first lease period expires, the privilege can be re-auctioned. Proceeds from such auctions can be shared, e.g., with the user who triggered the first action, or with the high bidder of a previous auction.

27 Claims, 2 Drawing Sheets

OTHER PUBLICATIONS

"InSearchofMy.com—Frequently Asked Questions," Network Solutions, 2000, 3 pp., Jul. 29, 2000.

"AddressAuction.com—The World's Only Truly Interactive Market for Secondary Domain names," Copyright 1999, 1 page.

U.S. Appl. No. 09/476,686, filed Dec. 30, 1999, Rhoads et al.

U.S. Appl. No. 09/531,076, filed Mar. 18, 2000, Rhoads et al.

U.S. Appl. No. 09/563,664, filed May 2, 2000, Levy et al.

U.S. Appl. No. 09/574,726, filed May 18, 2000, Rhoads et al.

U.S. Appl. No. 09/547,664, filed Apr. 12, 2000, Rhoads et al.

U.S. Appl. No. 09/571,422, filed May 15, 2000, Rhoads et al.

U.S. Appl. No. 09/292,569, filed Apr. 15, 1999, Rhoads et al.

U.S. Appl. No. 09/502,542, filed Feb. 10, 2000, Davis et al.

U.S. Appl. No. 60/189,246, filed Mar. 14, 2000, Levy.

U.S. Appl. No. 60/134,782, filed May 19, 1999, Rhoads.

* cited by examiner

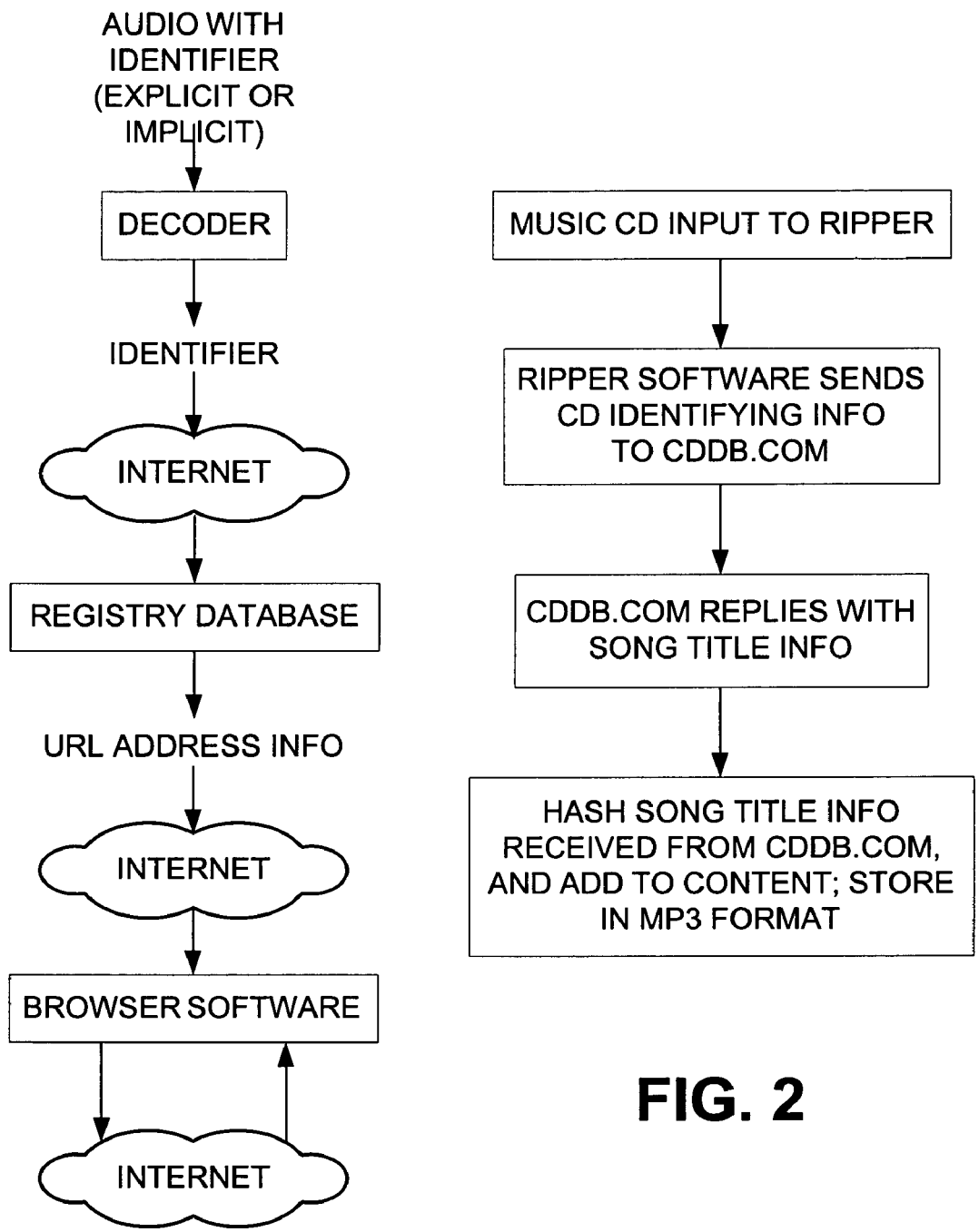

| | |
|---|---|
| 034 | www.sonymusic.com/catalog/05634.html |
| 112 | www.sonymusic.com/catalog/00014.html |
| 198 | www.supertracks.com/index/artists/taylor.htm |
| 376 | www.emusic.com/0555353x.pdf |
| 597 | www.cdw.com/music/featured_CDs/index.html |
| 612 | www.sonymusic.com/catalog/00231.html |
| 850 | www.polygram.com/franklin/adf_234.htm |
| 921 | www.loudeye.com/rap/1999/46755646.html |

FIG. 3

| | |
|---|---|
| 034 | www.sonymusic.com/catalog/05634.html |
| 112 | www.sonymusic.com/catalog/00014.html |
| 198 | www.supertracks.com/index/artists/taylor.htm |
| 376 | www.emusic.com/0555353x.pdf |
| 597 | www.cdw.com/music/featured_CDs/index.html |
| 612 | www.sonymusic.com/catalog/00231.html |
| 850 | www.polygram.com/franklin/adf_234.htm |
| 883 | www.userdefined.com/00004.html |
| 921 | www.loudeye.com/rap/1999/46755646.html |

FIG. 4

CONSUMER DRIVEN METHODS FOR ASSOCIATING CONTENT INDENTIFIERS WITH RELATED WEB ADDRESSES

RELATED APPLICATION DATA

The subject matter of the present application is related to that disclosed in copending application Ser. No. 09/476,686, filed Dec. 30, 1999; 09/531,076, filed Mar. 18, 2000; Ser. No. 09/563,664, filed May 2, 2000; and 09/574,726, filed May 18, 2000. The disclosures of these applications are incorporated herein by reference.

FIELD OF THE INVENTION

The present invention relates to leasing of virtual addresses, as may be associated with music or other media content.

BACKGROUND AND SUMMARY OF THE INVENTION

For expository convenience, the present disclosure is illustrated with reference to audio content. However, it should be recognized that the principles described below are applicable in any media context, including still imagery, video, product packaging, etc.

In the cited patent applications, the present assignee disclosed a variety of technologies by which audio content can be associated with corresponding internet resources. In some such approaches, the audio content is steganographically encoded (e.g., by digital watermarking) to convey an identifier. When a computer encounters such an encoded audio object, it discerns the encoded identifier, forwards the identifier to a remote database (a "Registry database"), and receives in response—from a database record indexed by the identifier—the address of one or more internet resources related to that audio (e.g., fan sites, concert schedules, e-commerce opportunities, etc.) The computer can then link to such a resource and present same to a user, e.g., using an internet browser program. Such an arrangement is shown in FIG. 1.

There are many variations on this model. For example, instead of steganographically encoding the identifier in the content, the identifier can be added into header or other data with which the content is conventionally packaged.

The identifier can be assigned to the content. Or the identifier can be derived, in some manner, from the content.

In the former, assigned identifier case, an entity such as a music publisher (e.g., Sony) or a music distributor (e.g., emusic.com), selects a number for encoding into the content. The number may be selected from a limited range of numbers (e.g., a range of numbers allocated to that publisher by the proprietor of the Registry database), but the number itself is not inherently related to the content with which it is associated.

In the latter case, the identifier is derived from the content, or from other information associated with the content.

One way to derive an identifier is to employ selected bits of the content, itself, as the identifier. For example, in MP3 audio, where the signal is encoded into frames, the Nth bit of the first 128 frames of a musical work can be assembled together into a 128 bit identifier. Or data present in MP3 headers can be used. In another approach, some or all of the content data is processed by a hashing algorithm to yield a 128 bit identifier corresponding to that content. In both of these cases, the identifier is implicit in the audio itself. That is, no data needs to be added (e.g., in a header, or by steganographic encoding).

When deriving the identifier from associated information, one can use the table of contents (TOC) of the CD or file allocation table of the DVD. The ID can be embedded within the MP3 file, if it is being ripped from the CD or DVD at the time or ID creation. The method of embedding can be embedded via header, footer or frame bits, or via a watermark.

Some techniques for deriving an identifier may rely on external resources. For example, when "ripping" a song from a commercial music CD into MP3 form, many ripper software programs refer to an on-line disc recognition database, found at www.cddb.com, to obtain the title and length of the song. This "table of contents" information can be used to form the identifier, e.g., by selecting predetermined bits, hashing, etc. In this case, the identifier must generally be added to the audio (i.e., it is explicit, as was the case of the assigned identifiers). Such an arrangement is shown in FIG. 2.

The artisan will recognize that there are an essentially infinite number of algorithms by which such derived identifiers can be generated. (It will be noted that derived identifiers may not be unique. That is, two unrelated audio files may—coincidentally—correspond to the same identifier. But by making the identifier sufficiently long (e.g., 128 bits), such occurrences can be made arbitrarily unlikely.)

When an identifier is assigned to content, the entity doing the assigning (e.g., a record label such as Sony, or a music distributor such as Emusic) can ensure that the Registry database has a record corresponding to that identifier. The database record contains, e.g., one or more URL(s) leading to information relating to the audio content.

A different situation arises when the identifier is derived from content. No master authority ensures that the Registry database has a record corresponding to that identifier. Thus, if a college student rips music from a privately-produced CD into an MP3 file, the identifier derived from that music may not point to an active database record in the Registry database. This can also occur with CDs from major or minor labels that don't register all their identifiers. For example, the Kinks' CDs may not be registered by the label owning rights to their albums because of their fall in popularity. However, a general consumer/business person could register the CD's identifier to sell Kinks' paraphernalia. The consumer/business person does not need to make the same amount of revenue as the record label to make the registration process and maintenance worth his/her time.

If the MP3 file so-produced becomes popular, and is widely spread (e.g., through means such as Napster, Gnutella, etc.) a large potential audience may develop for internet resources related to that MP3. The issue then arises: who manages the Registry database address represented by the corresponding identifier?

The present invention addresses this and related issues.

In accordance with one aspect of the present invention, a user who encounters an unused Registry database record is given an option to manage it, or to participate financially in its exploitation.

For example, in one embodiment, when the Registry database first receives a query corresponding to an un-used identifier, the person initiating the query is given an opportunity to lease that identifier for a predetermined period, such as two months. Upon payment of a nominal fee (e.g., $10), the user can specify a URL that will be stored in the Registry database in association with that identifier, and to which subsequent users will be directed.

In accordance with another aspect, when a user first queries an un-used identifier in the Registry database, an auction commences, with a nominal opening bid (e.g., $10). The auction continues for a short period, such as a week or a month, allowing other persons who encounter such music early in its distribution life to have a chance at gaining the leasehold rights. At the end of the auction, the winner is granted a lease to that identifier for a predetermined period and can specify the URL with which that identifier is associated.

At the end of the predetermined period, the identifier can be leased for a subsequent term—either for a fixed fee (e.g., a multiple of the fee earlier charged), or through an auction.

It will be recognized that this arrangement has certain similarities to the present system for internet domain name registration. A user can query a whois database maintained by Network Solutions and the like to determine whether a domain name is assigned. If it is not, Network Solutions will offer to assign the domain name for a term of years in exchange for a payment. But the present invention serves different needs and is otherwise different in certain details.

The foregoing and other features and advantages of the present invention will be more readily apparent from the detailed description, which proceeds with reference to the accompanying drawings.

BRIEF DESCRIPTION OF THE DRAWINGS

FIG. 1 shows an arrangement by which media content is linked to associated internet resources.

FIG. 2 shows a process employing an external resource (here www.cddb.com) to derive an identifier corresponding to audio content.

FIG. 3 shows a Registry database with which one embodiment of the present invention is illustrated.

FIG. 4 shows the Registry database of FIG. 3 after entry of a new record.

DETAILED DESCRIPTION

Referring to FIG. 3, an exemplary Registry database can be conceptualized as a large look-up table. Each active record includes an identifier and a corresponding URL. When a consumer uses a suitably equipped device (e.g., a personal computer, or wireless internet appliance) to decode an identifier from audio content and send the identifier to the database, the database responds by returning the URL corresponding to that identifier back to the user device. The user device then directs an internet browser to that URL. By such arrangements, music (e.g., in MP3 format) can serve as a portal to a web site dedicated to the music artist, a web site giving concert schedules for the artist, a web site offering CDs, etc.

In the FIG. 3 example, if the device decodes the identifier '376' from an MP3 file, and queries the database with this data, the database returns the URL www.emusic.com/0555353x.pdf. The user's web browser is then directed to that URL. (For expository convenience, the identifiers are assumed to be in the range 0–1023. In actual implementations, a much larger range would usually be used.)

The just-described sequence of operations is illustrative and is subject to numerous variations—various of which are detailed in the earlier-cited applications.

Now assume that an up-and-coming band ("The Pinecones") releases a song in MP3 format. No identifier is affirmatively assigned to the MP3 when it is encoded, but compliant players process the MP3 data to derive an identifier. (An exemplary algorithm may take the first ten frames of MP3 data, and select the $100^{th}$ data bit from each frame, to yield a ten bit identifier.) The derived identifier may be '883.' A listener of the song forwards this '883' identifier to the Registry database, hoping thereby to be linked to supplemental information about The Pinecones or the song. Instead, the Registry reports (e.g., by a default web page) that there is no further information related to that MP3 (i.e., there is no database record corresponding to identifier '883').

In this case, the Registry can invite the listener to remedy this deficiency and to create a web page that will be associated with that song. In exchange for a small fee, the listener is allowed to specify a URL that will be associated with that identifier for a month. If the user is not equipped to design and host a web page, the Registry can provide simple web page authoring tools and a hosting service permitting the listener to easily create a page on-line.

If the listener accepts this invitation, he makes the payment by various known methods (e.g., via credit card, by one of several emerging web currencies, etc.). He then composes (or specifies) a web page to correspond to that song. The Registry is updated to include a new record for identifier '883,' and includes a link to the page specified by the listener (e.g., www.userdefined.com/00004.html). The table after updating is shown in FIG. 4.

If the user wishes, he can complement the substance of the linked page with banner advertising, co-op links to on-line retailers (e.g., Amazon.com), or other revenue-producing uses.

Other copies of the same bit-rate Pinecones' MP3 file likewise do not have an assigned identifier. However, compliant players will all derive identifiers using the same algorithm, so all other listeners of the song will be directed to the same '883' identifier in the Registry database. Once the first listener activates such a record, later listeners who link to the Registry will be linked to the www.userdefined-.com/00004.html web page specified by the first listener.

Since the ID is automatically generated, it may be different for each bit-rate MP3 release as well as for each CD release. Different bit-rate MP3 releases, such as 128 kbps and 96 kbps releases, produce different bits in the resulting MP3 file; thus, the automatically generated identifiers may be different. CD releases refer to different mixes of the music, not copies of the master CD; thus, different CD releases have different bits on the CD and, correspondingly, the automatically generated identifiers may be different for each CD release. In addition, if the MP3 version is ripped by the consumer from the CD, the compliant ripper should embed the identifier generated from the CD into the MP3 file. This structure is necessary because various consumer rippers produce different bits in the MP3 file, since the MP3 format only defines a standard decoder. In all of these cases, the server has two options. One option is to check and make sure that the same song and artist don't already exist. If they do, the new identifier is linked to the same web page. The second option is to allow each identifier, even if from the same song but different MP3 or CD releases, to have an owner.

Of course, by suitably designing the algorithm by which identifiers are derived, non-identical versions of the same basic content may nonetheless correspond to the same identifier. There is extensive published research on such technology, e.g., hashing algorithms by which similar or related, but non-identical, inputs map to the same hash outputs.

In another embodiment, the first listener does not have an absolute right to lease the identifier. Rather, the first listener is given a "first mover" advantage in a brief auction for that identifier. By placing a minimum starting bid (e.g., $10), an auction for the identifier is commenced, and continues for a week. Subsequent listeners who link to that identifier during the auction are given the opportunity to beat the then-highest bid. At the end of the auction period, the high bidder is charged (typically by pre-arranged means), and given the opportunity to specify a link for that identifier. (Again, the Registry operator may offer to host the linked page.)

In a variant of the foregoing, the final bid proceeds are split, with the Registry proprietor sharing a portion (e.g., 5–50%) of the proceeds with the listener who initiated the auction. This may create a strong incentive for use of the system, as listeners try to find music not already linked by the database, hoping to start auctions and share in their proceeds.

Assume the initial lease is for a period of two months. During that period The Pinecones have become wildly popular, and thousands of listeners are linking to the corresponding web page daily. The link is now a hot property. At the expiry of the initial lease term, the Registry proprietor can re-auction the link. The band or its promoters may naturally be one of the bidders. This time the auction may result in large bids, commensurate with the popularity of the music to which it corresponds. Again, the proceeds of the auction may be shared by the Registry proprietor, e.g., with the original listener who discovered the identifier, or with the party who was high bidder in the previous (initial) auction.

In similar fashion, the linking rights can be re-auctioned periodically, with the price being proportional to the music's then-current popularity.

It will be recognized that much of the internet is pornography, and some of the persons leasing identifier links from the Registry may seek to promote pornographic or other inappropriate sites by such links. Accordingly, the Registry may place certain limitations on the linked sites. The sites may be checked for RSAC ratings, and only sites with non-adult ratings may be allowed. Alternatively (or additionally), the sites may be automatically scanned for keywords or content (using intelligent search engines, possibly based upon trained networks and/or artificial intelligence) suggesting pornography, and those having such words may be manually reviewed. Etc.

The proprietor may also require that the linked pages contain at least a threshold amount of non-advertising content (e.g., 50% of screen display)—again to encourage use of the identifiers as links to bonafide resources related to the corresponding audio content.

The problem of automated "bots" querying all possible identifiers in the Registry in an attempt to identify and usurp the inactive entries is mitigated by (a) the huge universe of such identifiers, and (b) the costs of registering.

The maintenance of the table 12 is well understood by those skilled in data structures. For ease of description, the present disclosure assumes that the entries are sorted, by identifier. In actual implementation, this may not be the case. The system may be keyed by identifier, song and artist, thus increasing the speed at which the system can find duplicate songs with different identifiers.

From the foregoing, it will be recognized that embodiments of the present invention can be utilized to spur grassroots development of internet resources associated with a wide variety of media content objects. Commerce in a new class of virtual assets is enabled—offering the possibility of significant financial returns to individuals who have a knack for identifying popular music before it becomes popular. A link that was first leased by a high-schooler for $10 may later be re-leased to Sony Music for $10,000. The virtual real estate represented by these identifiers is priced, over time, commensurately with their changing commercial importance.

Having described and illustrated the principles of the invention with reference to illustrative embodiments, it should be recognized that the invention is not so limited.

For example, while the discussion contemplated that the unassigned identifiers were derived from the content, the same or similar approaches can be applied with assigned identifiers.

Likewise, it will be recognized that the universe of identifiers may be segmented in various ways to achieve various purposes, and only a subset of the entire universe of possible identifiers may be made available in the manners here described. For example, derived identifiers may be designed to map into a lower half of a universe of possible identifiers, with the upper half being reserved for assigned identifiers, i.e. setting the most significant bit to determine whether the identifier is assigned or automatically generated.

The principles described herein are applicable in other contexts and in other applications, e.g., wherever there exists a large universe of identifiers, some of which correspond to objects, and that correspondence is not initially known to an entity controlling usage to which the identifiers are put. To name but one alternative, when video compression and Internet bandwidth improve, this auction system can be applied to videos.

While the explicit identifiers detailed above took the form of watermarks and header data, these are illustrative only; any form of identifier can be similarly treated as virtual real estate and granted to its discover. Thus, systems based on barcodes and other identifiers may make use of the principles of this invention.

To provide a comprehensive disclosure without unduly lengthening this specification, the patents and applications cited herein are incorporated herein by reference.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

We claim:

1. A method of operating a database that has plural records, the method including receiving queries, each including an identifier, and replying to said queries by reference to information from database records associated with said identifiers, said identifiers being drawn from a universe of possible identifiers, a majority of which do not have active database records associated therewith, the method including:

receiving a query from a user including an identifier that has no active database record associated therewith, said identifier being derived from an existing media content object; and permitting the user to create an active database record corresponding to said identifier.

2. The method of claim 1 that includes allowing the user to pay a fee, said fee entitling the user to specify at least a portion of the database record corresponding to said identifier.

3. The method of claim 1 that includes allowing the user to make a first bid in an auction, said auction continuing for a predetermined period commencing with said first bid.

4. A method comprising:

deriving an identifier corresponding to an existing media content object;

querying a database with the derived identifier; and if the database has no active record corresponding to said derived identifier, permitting a party who first queried the database with said identifier to define such a record.

5. The method of claim 4 in which the media content object is an audio file.

6. The method of claim 4 in which the media content object is an MP3 audio file.

7. The method of claim 4 in which the media content object is a video file.

8. The method of claim 4 in which the deriving includes consulting a resource external of the media content object.

9. The method of claim 8 in which the resource is a database.

10. The method of claim 4 in which the deriving includes processing data from the media content object to obtain said identifier.

11. The method of claim 4 in which several identifiers can correspond to the same media content object.

12. The method of claim 11 in which the identifiers are automatically generated from different releases of an audio CD, wherein the releases have different audio and/or table of contents.

13. The method of claim 11 in which the identifiers are automatically generated from different versions of an MP3 file, wherein the versions have different bits due to the compression and/or bit-rate.

14. A method of managing a universe of identifiers, some of said identifiers being active and having internet resources associated therewith, and others of said identifiers being inactive, the method including receiving a query corresponding to an inactive identifier and, in response, initiating a time-limited auction, a winner of said auction being granted the privilege of associating an internet resource with said identifier for at least a predetermined time period.

15. The method of claim 14 in which said active identifiers correspond to different audio content, and the internet resources corresponding to said active identifiers correspond to said audio content.

16. A method comprising:

auctioning to the highest bidder the privilege of defining a link that is to be associated, for a predetermined time period, with an identifier through a database; and at the expiry of said predetermined time period, re-auctioning said privilege.

17. The method of claim 16 in which the proceeds of said re-auctioning are shared with the high bidder of a previous auction for said privilege.

18. The method of claim 16 in which the identifier corresponds to an existing media content object.

19. The method of claim 18 in which the identifier is derived, rather than assigned.

20. The method of claim 1 wherein a primary function of the database is to link consumers to internet resources, such as web pages, that promote goods or services that are related to the media content objects and that are offered by commercial entities, and said user is one of said consumers, wherein the consumer can participate in such linking in a manner customarily reserved to the commercial entities.

21. The method of claim 1 that includes automatically providing the identifier from a process on a user device—such as a computer—to the database, without requiring the user to type or otherwise manually enter the identifier.

22. The method of claim 4 wherein a primary function of the database is to link consumers to internet resources, such as web pages, that promote goods or services that are related to media content objects and that are offered by commercial entities, and said party is one of said consumers, wherein the consumer can participate in such linking in a manner customarily reserved to the commercial entities.

23. The method of claim 1 that includes automatically providing the identifier from a process on a device maintained by said party—such as a computer—to the database, without requiring said party to type or otherwise manually enter the identifier.

24. The method of claim 14 wherein said identifiers and internet resources are associated through a database, a primary function of which is to link consumers to internet resources that promote goods or services that are related to media content objects and that are offered by commercial entities, and said winner is one of said consumers, wherein the consumer can participate in such linking in a manner customarily reserved to the commercial entities.

25. The method of claim 14 that includes automatically deriving the identifier using a device maintained by said winner, without requiring said winner to type or otherwise manually enter the identifier.

26. The method of claim 16 wherein a primary function of the database is to link consumers to internet resources that promote goods or services that are related to media content objects.

27. The method of claim 16 that includes automatically deriving the identifier from a media content object.

* * * * *